United States Patent [19]

Zeitraeg

[11] 4,330,854
[45] May 18, 1982

[54] APPARATUS FOR GENERATING AN EXCHANGE PULSE TRAIN FOR USE IN A TELECOMMUNICATIONS SYSTEM

[75] Inventor: Rolf Zeitraeg, Munich, Fed. Rep. of Germany

[73] Assignee: Siemens Aktiengesellschaft, Berlin and Munich, Fed. Rep. of Germany

[21] Appl. No.: 120,910

[22] Filed: Feb. 12, 1980

[30] Foreign Application Priority Data

Feb. 27, 1979 [DE] Fed. Rep. of Germany ....... 2907608

[51] Int. Cl.³ ............................................. H04J 3/06
[52] U.S. Cl. .................................... 370/100; 370/16; 375/108; 328/155
[58] Field of Search .................. 370/103, 100, 16, 13; 375/108, 118, 119, 120; 328/155

[56] References Cited

U.S. PATENT DOCUMENTS 3,803,568  4/1974  Higashide ............................ 375/108
3,974,333  8/1976  May et al. ........................... 375/108

FOREIGN PATENT DOCUMENTS 2636150  1/1978  Fed. Rep. of Germany .
2003365  3/1979  United Kingdom .

OTHER PUBLICATIONS

*Principles of Color Television*, by Hazeltine Lab Staff, New York, 1956, pp. 170-191.
"Rechteckgenerator Mit Digital Einstellbarer Frequenz", by Grosskopf et al, *Elektronik* Magazine, vol. 8, (1973), pp. 285-287.
"Automatische Frequenznachstellung in Plesiochronen Analogen und Digitalen Fernmeldenetzen", by Schott, *Tekade Techn. Mitt.*, (1978), pp. 24-28.

*Primary Examiner*—Douglas W. Olms
*Attorney, Agent, or Firm*—Spellman, Joel & Pelton

[57] ABSTRACT

In order to provide the possibility of interchange of roles of leading and led exchange pulse train generators, an exchange pulse train (T") of the led generator is synchronized in phase with that (T') of a leading generator. Each generator derives its exchange pulse train (T', T") from a respective intermediate pulse train (H', H") by means of a frequency reduction arrangement (BKP, U). Comparison in the led generator (UGN, BKN, UGV, BKV, BKVv) of the exchange pulse trains detects a relative phase lead or lag greater than a given threshold value of the same order as the intermediate pulse train period and, in order to maintain in-phase synchronism, shortens or lengthens (BKR), as appropriate, a half period signal portion of the exchange pulse train by an intermediate pulse train period. The intermediate pulse generator is servo-synchronized by means of a master pulse train derived in a frequency adjuster from a received standard pulse train.

7 Claims, 4 Drawing Figures

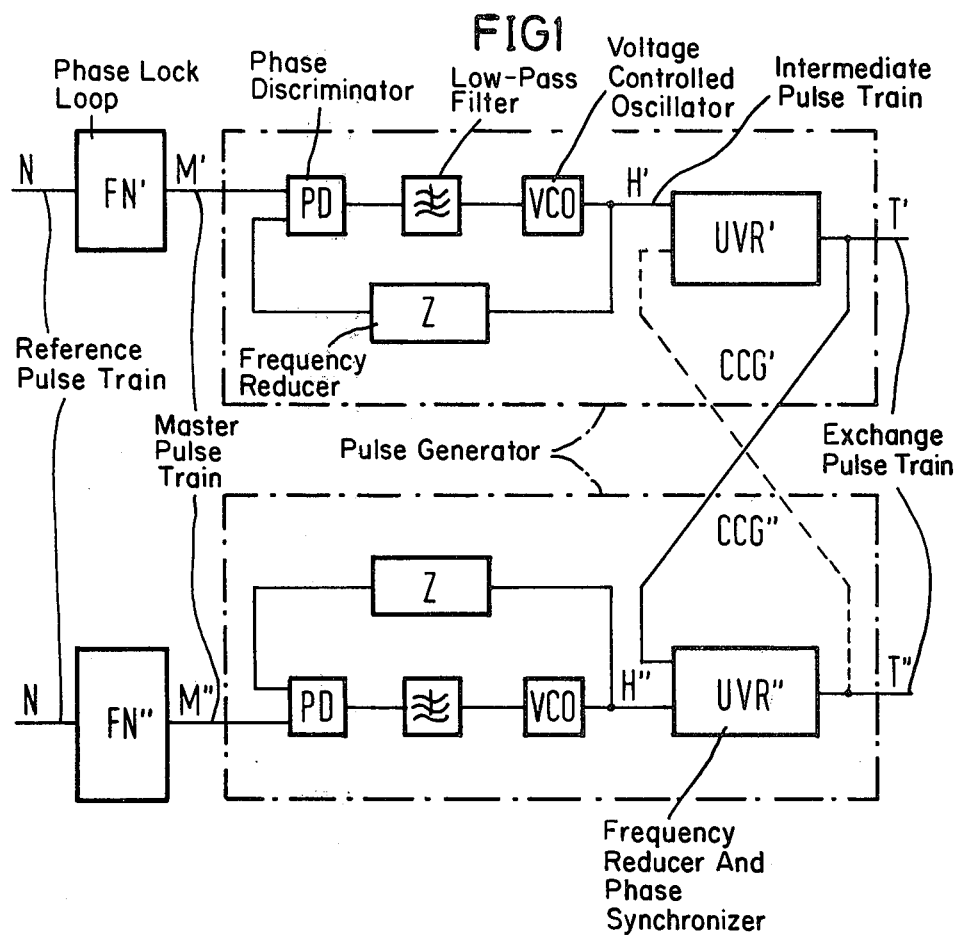

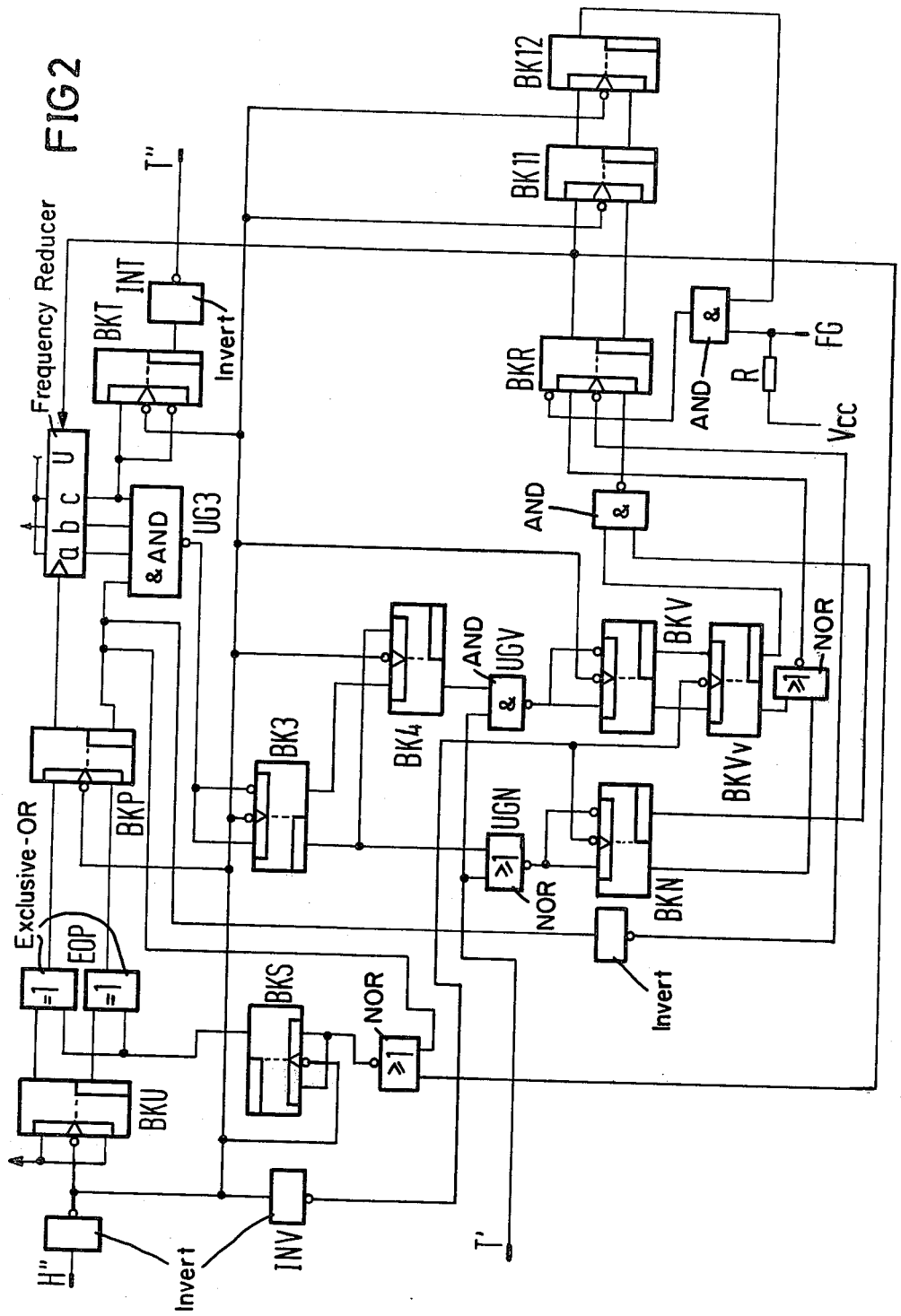

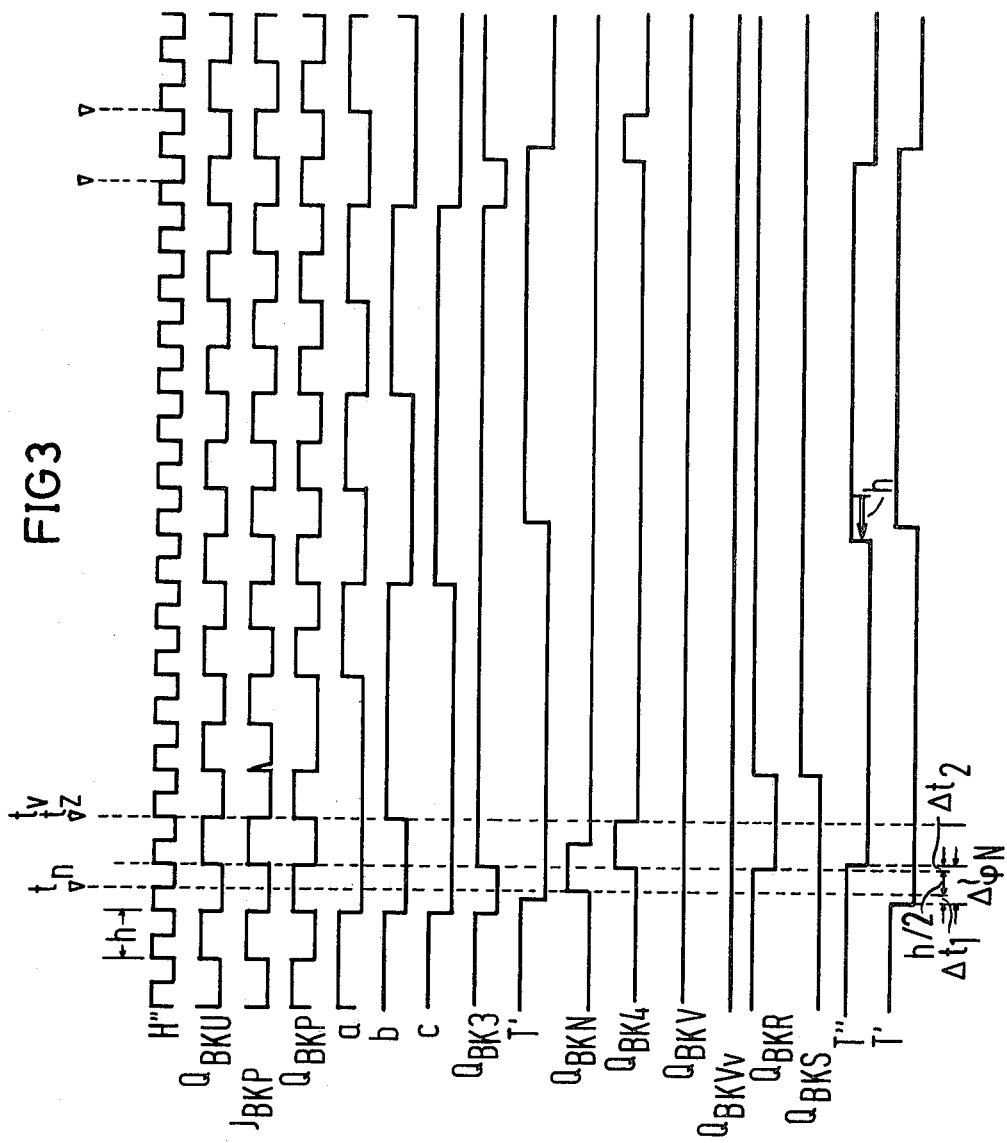

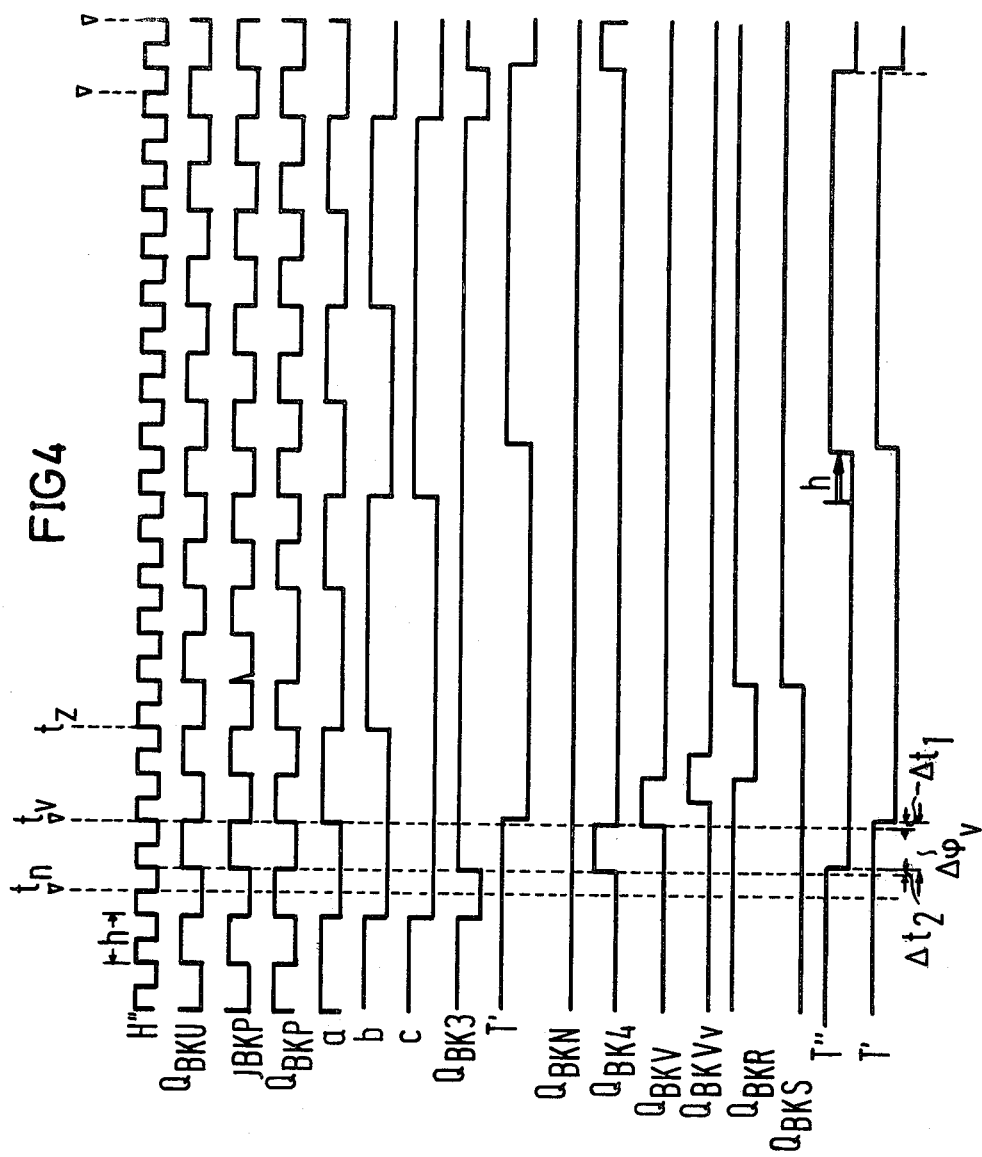

APPARATUS FOR GENERATING AN EXCHANGE PULSE TRAIN FOR USE IN A TELECOMMUNICATIONS SYSTEM

BACKGROUND OF THE INVENTION

This invention relates to apparatus for generating an exchange pulse train for use in a telecommunications system, in particular in a time division multiplex ("t.d.m.") digital exchange system.

Supplying telecommunications systems, in particular t.d.m. digital exchange systems, and the transmission lines of such telecommunications systems, with an exchange pulse train whose pulse frequency is determined preferably servo-synchronously entails problems, two of which are ensuring the accuracy and breakdown resistance of such a pulse supply system.

In this respect it is known from German Auslegeschrift No. 26 36 150 that a phase-accurate synchronisation of fundamental generators can be achieved in carrier frequency transmission systems with a standard frequency transmitted over long distance traffic networks by means of digital, phase-accurate frequency adjustment for course setting, and analog frequency adjustment for fine setting. For the coarse adjustment a digital phase regulating loop is formed which, in respect of each beat cycle between the standard frequency and the reference frequency of the oscillator which is to be pulled into step, produces only one digital adjustment step for the purpose of frequency correction. In addition, an analog phase regulating loop is provided whose pull-into-step adjustment range corresponds to approximately double the adjustment step of the digital regulating loop, and the center of the analog adjustment range lies midway between consecutive response points, assigned to a beat cycle, of the digital regulating loop.

In the event that the analog adjustment range is exceeded, an adjustment step is triggered by the digital regulating loop which causes the phase of the reference frequency of the oscillator which is to be pulled into step to return to approximately the center of the adjustment range of the analog phase regulating loop, and the adjustment value formed in this way is stored.

With a frequency adjustment method of this kind, in the event of the breakdown of supply of the standard frequency, the stored adjustment value is retained (see also Tekade Techn. Mitt. (1978), pages 24 to 28) so that interruptions in the standard frequency transmission do not affect the short-term frequency stability of the oscillator; however, in the event of a breakdown of the frequency adjustment device, frequency stability is no longer assured.

In addition, German Offenlegungsschrift No. 27 37 713 discloses a t.d.m. digital exchange sytem comprising switching network devices which are provided in duplicate and during disturbance-free operation operate in parallel to one another and each of which assumes approximately half the traffic. It is already known to provide in duplicate an exchange pulse generating arrangement which supplies the exchange and the lines outgoing therefrom with an exchange pulse train whose bit frequency is preferably determined by an auto-synchronous and/or a servo-synchronous process, in which case a first of the two exchange pulse generating arrangements supplies one of the duplicated switching network devices and the lines outgoing from the exchange with an exchange pulse train which has been produced, independently of the second exchange pulse generating arrangement, and the latter supplies the other of the duplicated switching network devices with an exchange pulse train which is synchronised to be in phase with the exchange pulse train supplied by the first exchange pulse generating arrangement. The exchange pulse trains produced in the two exchange pulse generating arrangements are virtually equal in phase, so that when the bit streams conveyed via the two halves of the switching network are combined at the output end, only negligible phase differences occur between the two bit streams.

Also in the event of a mutual switch-over of the roles of the exchange pulse generating arrangements, as the result of which previously leading and led exchange pulse generating arrangements are now led and leading, respectively, only a limited phase jump occurs which does not impair the synchronism of line regenerators inserted into the lines outgoing from the exchange.

At the same time the possibility is provided that, in the event of a disturbance or intervention for purposes of servicing, there is no need for undesirable phase jumps since, having been rerouted, the two halves of the switching network can be supplied from only a single one of the exchange pulse generating arrangements for which purpose, in a further development, the individual switching network devices can be supplied with the exchange pulse trains of the two exchange pulse generating arrangements from an appropriate switch-over device.

In this known system, when servo-synchronisation is used the master pulse train is fed only to one of the two exchange pulse generators. If, for reasons of resistance to breakdown, it is desired to increase the circuit redundancy and, in the case of duplicated exchange pulse generating arrangements to frequency-synchronise both exchange pulse generators using different master pulse train sources in a servo-synchronous process, it is necessary to limit deviations from the desired phase quality of the two exchange pulse trains to a maximum permissible value even when the master pulse trains (having a fundamentally identical pulse train frequencies) supplied to the two exchange pulse generators can differ in phase by up to $2\pi$.

SUMMARY OF THE INVENTION

It is therefore an object of the present invention to provide apparatus for generating a pulse train, for use in a telecommunications exchange, which comprises two identical (duplicate) pulse generators connected symmetrically so that either one may lead the other.

It is a further object of the present invention to provide apparatus of the above mentioned type in which a first exchange pulse train produced by the leading generating arrangement is substantially in phase with the second exchange pulse train produced by the other, led generating arrangement.

These objects, as well as other objects which will become apparent from the discussion that follows, are achieved, according to the present invention, by providing such duplicate generating arrangements, each adapted to be servo-synchronized by means of a master pulse train and being arranged to operate alternatively so that, at any one time, one generating arrangement leads and produces a first exchange pulse train independently of the other, led, generating arrangement which produces a second exchange pulse train, substantially in phase with the first exchange pulse train. Each of the duplicate generating arrangements includes means for producing an intermediate pulse train whose period is less than or equal to a predetermined permitted maximum phase difference between the first and second exchange pulse trains. Each generating arrangement also includes a frequency reducer, connected to receive the intermediate pulse train, for deriving the respective exchange pulse train, as well as means adapted to receive the exchange pulse train from the other, duplicate generating arrangement, and connected to the frequency reducer, for comparing the two exchange pulse trains to detect when the phase difference between them exceeds a threshold value of the order of the intermediate pulse train period. Finally, each generating arrangement includes means for advancing or retarding the exchange pulse train produced by its frequency reducer by one intermediate pulse train period if such exchange pulse train is, respectively, lagging or leading in phase the exchange pulse train of the other generating arrangement.

Expediently, the two exchange pulse generating arrangements are supplied with the master pulse trains from respective frequency adjustment devices each of which is supplied with a standard pulse train and simultaneously stores the adjustment value.

In one embodiment, in each generating arrangement, an intermediate pulse generator, which is servo-synchronised by the master pulse train, is followed by a digital pulse reduction and phase synchronisation circuit which has a comparator with an input to the output of the other exchange pulse generating arrangement and at whose output occurs the relevant exchange pulse train. This permits phase synchronisation between the exchange pulse trains without intervention into the actual intermediate pulse generator of the led exchange pulse generating arrangement.

In a further development, the digital pulse reduction and phase synchronisation circuit possesses an intermediate pulse train frequency halving stage whose output is connected, via a phase switch-over device which is actuated on the detection of each phase difference exceeding the relevant threshold value, to a further frequency reducer which is stepped on by one extra counting step only in the case where the second exchange pulse train lags in phase. The output of the second frequency reducer is connected to the exchange pulse train output of the exchange pulse generating arrangement. This frequency reducer may also be connected via two exchange pulse train time window circuits to respective first inputs of two logic-linking elements which are each supplied, at their second inputs, with the exchange pulse train of the leading exchange pulse generating arrangement, and which lead, via following bistable trigger elements and an OR-circuit, to an adjustment element which controls the frequency reducer and whose output is connected to a control element for the phase switch-over device.

In another development, the adjustment element possesses a blocking input for a switch-over signal to interchange the roles of the exchange pulse generating arrangements.

Embodiments of this invention will now be described, by way of example, with reference to the accompanying drawings.

BRIEF DESCRIPTION OF THE DRAWINGS

FIG. 1 is a schematic block circuit diagram of apparatus for the generation of an exchange pulse train and embodying this invention.

FIG. 2 is a circuit diagram of a device of the apparatus shown in FIG. 1.

FIGS. 3 and 4 are graphs illustrating the mode of operation of the device shown in FIG. 2.

DESCRIPTION OF THE PREFERRED EMBODIMENTS

Referring to FIG. 1, in a t.d.m. digital telecommunications exchange, apparatus for exchange pulse train generation comprises duplicate exchange pulse generating arrangements or generators CCG', CCG''. One of the two exchange pulse generators, for example the exchange pulse generator CCG', will be assumed to supply, at its pulse train output T', an exchange pulse train which it produces independently of the other exchange pulse generator CCG'', and which possesses a pulse train frequency of e.g. 2,048 MHz. The exchange pulse generator CCG'' will be assumed to supply, at output T'', an exchange pulse train of identical frequency which is synchronised to be at least approximately in phase with the exchange pulse train supplied by the exchange pulse generator CCG'.

The two exchange pulse generators CCG' and CCG'' are each servo-synchronised in pulse train frequency by means of a master pulse train M', M'' having a pulse train frequency of e.g. 2.048 MHz, which is fed to the relevant exchange pulse generator CCG', CCG'' from a frequency adjustment device FN', FN'' which is itself supplied with a standard pulse train N of e.g. likewise 2.048 MHz. Frequency adjustment devices of this kind, which fundamentally comprise a PLL (phase locked loop) oscillator and a store for the adjustment value, in which the latter is retained in the event of a breakdown of the standard pulse train, are well known (e.g. from German Auslegeschrift No. 26 36 150) and consequently will not be described in detail here. It will be sufficient to mention that these frequency control devices are capable of ensuring the required frequency tolerance of the master pulse trains M', M'' of $10^{-9}$/day.

Here it should be noted that the standard pulse train N can itself be directly derived from a central standard pulse generator to which a plurality of identical or similar circuit arrangements are connected in parallel; however, the standard pulse train N can also be derived from a central standard pulse generator via a chain connection of master-slave operated pulse generators and frequency adjustment circuits.

The two master pulse trains M' and M'' can differ in phase by up to $2\pi$ (corresponding to 488 ns with a master pulse train frequency of 2.048 MHz). However, in order that the phase difference between the two exchange pulse trains T' and T'' should remain within the desired limits of, for example ±35 ns, both the leading exchange pulse generator CCG' and the led exchange pulse generator CCG''—servo-synchronised by the master pulse trains M' and M''—each produce an intermediate pulse train H', H'' with a pulse train period h (FIGS. 3 and 4) of e.g. 30.52 ns (with an intermediate pulse train frequency of 32.768 MHz) which is less than or equal to the predetermined maximum permissible phase difference (in this example 35 ns) between the exchange pulse trains T' and T''.

In the apparatus shown in FIG. 1, this intermediate pulse train generation is carried out in a PLL intermediate pulse train generator which comprises a phase discriminator PD, a low-pass filter, a voltage controlled oscillator VCO and a frequency reducer Z. PLL pulse generators of this kind are well known (e.g., from "Principles of Colour Television", John Wiley & Sons Inc., New York 1956, page 180; ELEKTRONIK (1973) 8, pages 285 to 287), for which reason they will not be discussed in detail here.

The intermediate pulse generator Z-PD-VCO, servo-synchronised by the master pulse trains M" (or M'), of the led (or leading) exchange pulse generator CCG" (or CCG') is followed by a digital pulse reduction and phase synchronisation circuit UVR" (or UVR') which has a comparator input connected to the output T' of the leading exchange pulse generator CCG', and at whose output T" there occurs the exchange pulse train of the led exchange pulse generator CCG".

In the digital pulse reduction and phase synchronisation circuit UVR", the exchange pulse train T" of the led exchange pulse generator CCG" is compared with the exchange pulse train T' of the leading exchange pulse generator CCG', and in the event that a phase difference is established between the two exchange pulse trains which exceeds a threshold value of the order of one intermediate pulse train period, one half period signal portion of the exchange pulse train T" is shortened by the length of one intermediate pulse train period in the case of a lagging exchange pulse train T", and is extended thereby in the case of leading exchange pulse train T", as will be explained in detail below.

Referring to FIG. 2, the digital pulse reduction and phase synchronisation circuit UVR" (the circuit UVR' is identical) has a mode of operation which is illustrated in FIGS. 3 and 4. In the circuit arrangement illustrated in FIG. 2, the intermediate pulse train input H" is supplied with the intermediate pulse train which is represented in graph H" in FIGS. 3 and 4 and which possesses the intermediate pulse train frequency of e.g. 32.768 MHz. This input leads to an intermediate pulse train frequency halving stage in the form of a bistable trigger element BKU, whose switching states are indicated in graph $Q_{BKU}$ in FIGS. 3 and 4.

The output of the intermediate pulse train frequency having stage BKU is connected via a phase switch-over device, formed by two EXCLUSIVE-OR gates EOP, and via a bistable trigger element BKP, to a further frequency reducer U which can consist of a binary counter. The output c of this counter, which corresponds to an exchange pulse train frequency of e.g. 2.048 MHz, is connected via a bistable trigger element BKT to the exchange pulse train output T" of the exchange pulse generator. Input signals and switching states of the bistable switching element BKP are indicated in FIGS. 3 and 4 as respective graphs $J_{BKP}$ and $Q_{BKP}$, whereas switching states of the frequency reducer U are represented as graphs a,b,c. The exchange pulse train which occurs at the exchange pulse train output T" of the circuit arrangement shown in FIG. 2 is represented as graph T" in FIGS. 3 and 4.

The frequency reducer U is connected to a phase comparator circuit which carries out a phase comparison between the exchange pulse train T" and the leading exchange pulse train which is supplied via a line T', as indicated in graph T' in FIGS. 3 and 4. This comparator circuit possesses two time window circuits, which are formed by AND-gate UG3 and bistable trigger elements BK3 and BK4. The switching states of the two bistable trigger elements are represented in graphs $Q_{BK3}$ and $Q_{BK4}$ in FIGS. 3 and 4.

The two bistable trigger elements BK3 and BK4 lead to first inputs of two logic-linking elements, namely NOR-gate UGN and AND-gate UGV, which are supplied at second inputs with the exchange pulse train T' of the leading exchange pulse generator. The two logic-linking elements UGN and UGV are followed by bistable trigger elements BKN, BKV and BKVv whose switching states are represented in graphs $Q_{BKN}$, $Q_{BKV}$, $Q_{BKVv}$ in FIGS. 3 and 4, and whose outputs having been combined via an OR-circuit lead to a bistable trigger element BKR. This bistable trigger element BKR is on the one hand connected by a switching input to the frequency reducer U, and on the other hand to a control element, composed of a bistable trigger element BKS, for the phase switch-over device EOP. The switching states of the two last mentioned bistable trigger elements are represented in graphs $Q_{BKR}$ and $Q_{BKS}$ in FIGS. 3 and 4.

The logic-linking elements UGN and UGV and the binary trigger elements BKN, BKV and BKVv establish whether the phase difference between the leading exchange pulse train T' and the led exchange pulse train T" exceeds the given threshold.

If the led exchange pulse train T" lags the leading exchange pulse train T' to such an extent that at the time $t_n$ (in FIG. 3)—i.e., the time of the negative-going pulse flank of the intermediate pulse train H" which occurs in the same window determined by the bistable trigger element BK3 (see graph $Q_{BK3}$ in FIG. 3) and directly prior to the negative-going pulse flank of the led exchange pulse train T"—a "0" level signal is present on the line which carries the exchange pulse train T', then the bistable trigger element BKN is activated via the NOR-gate UGN. Taking into account the operating times of logic-linking elements, inverters, and bistable trigger elements, this occurs in the event of a phase lead of the leading exchange pulse train T' over the led exchange pulse train T" which exceeds $$\Delta\psi_{Nmax} = \Delta t_{1max} + \Delta t_{2max} + h/2,$$

in which the significance of the individual terms is indicated in FIG. 3. In the circuit arrangement shown in FIG. 2

$$\Delta\psi_{Nmax} = (t_{UGNmax} + t_{BKNmax} - t_{INVmin}) + (t_{BKTmax} + t_{INTmax}) + h/2,$$

in which the indices indicated at the respective operating times each refer to a corresponding circuit component. In practice it is possible that $$\Delta\psi_{Nmax} = (5.5 + 3 - 1.2) + (7 + 1.3) + 15.26 = 30.8 \text{ ns}.$$

If, on the other hand, the exchange pulse train T' leads in phase the exchange pulse train T' to such an extent that at the time $t_v$ (in FIG. 4)—i.e., at the time of the positive-going pulse flank of the intermediate pulse train H" which occurs at the end of the time window determined by the bistable trigger element BK4 (see graph $Q_{BK4}$ in FIG. 4) and which directly follows the negative-going pulse flank of the exchange pulse train T'—a "1" level signal is present on the line which carries the exchanger pulse train T', then the bistable trigger element BKV is activated via the AND-gate UGV, and the bistable trigger element BKVv is activated one half intermediate pulse train period later. Taking into account the operating times of the logic-linking elements, inverters, and bistable trigger elements, this is the case in the event of a phase lead of the exchange pulse train T" over the exchange pulse train T' which exceeds $$\Delta\psi_{Vmax} = h - \Delta t_{2min} - \Delta t_{1min},$$

in which the significance of the individual terms may be understood from FIG. 4. In the circuit arrangement shown in FIG. 2

$$\Delta\psi_{Vmax} = h - (t_{BKTmin} + t_{INTmin}) - t_{UGVmin},$$

in which again the indices refer to the corresponding circuit components. In practice it is possible that $$\Delta\psi_{Vmax} = 30.52 - (1.6 + 1.2) - 1.8 = 25.9 \text{ns}.$$

Thus the limit values $\Delta\psi_{Nmax}$ and $\Delta\psi_{Vmax}$ are both of the order of one intermediate pulse train period h (of e.g. 30.52 ns) but less than the maximum phase difference permitted between the leading exchange pulse train T' and the led exchange pulse train T" which in the example amounts to 35 ns.

Both the activation of the bistable trigger element BKN and that of the bistable trigger elements BKV and BKVv result in the activation of the following bistable trigger element BKR which is reset via the bistable trigger elements BK11 and BK12 after two intermediate pulse train periods. A switch-over of the bistable trigger element BKS takes place simultaneously. This results in the frequency converter U now being supplied, via the phase change-over device EOP, with a pulse train which is inverted in comparison to the previously supplied pulse train. This, in turn, results in an extension of the currently occuring half period of the led exchange pulse train T" by the duration h of one period of the intermediate pulse train H", as indicated in graph T" in FIG. 4.

In the circuit arrangement illustrated in FIG. 2, the activation of the bistable trigger element BKR also results in the fact that the frequency reducer U, which can consist of a binary counter, is brought into the operating state corresponding to the counting state 2 at the time $t_z$; i.e., by means of the positive-going pulse flank of the intermediate pulse train H" which occurs during the active mode of the bistable trigger element BKR. In the event that the exchange pulse train T" leads in phase (FIG. 4), the frequency reducer U nevertheless adopts this operating state at this moment, so that the adjusting process does not have any further outcome. In the case of a lagging exchange pulse train T" (FIG. 3), at the time $t_z$ (in FIG. 3) the frequency reducer would take up an operating state corresponding to the counting state 1. In actual fact, however, the frequency reducer U is now brought into the operating state corresponding to the counting state 2. As a result, the reducer U is stepped on by an additional reduction step, which, in combination with the above-mentioned phase switch-over, gives rise to a reduction in the currently occuring half period of the exchange pulse train T" by the duration h of one period of the intermediate pulse train H", as is provided in the case of a lagging exchange pulse train T" and indicated in graph T" of FIG. 3.

In each case the led exchange pulse train T" follows the leading exchange pulse T' in phase. However, the phase synchronisation is accompanied by a certain hysteresis, so that jitter phenomena of the leading exchange pulse train T', which in practice can occur with time amplitudes approximately of the order of 5 ns, can be disregarded. From FIGS. 3 and 4, the hysteresis range $\delta$ is given by $$\delta = \Delta\psi_{Nmin} + \Delta\psi_{Vmin} - h$$

$$\delta = t_{UGNmin} + t_{BKNmin} - t_{INVmax} - t_{UGVmax} + h/2.$$

In practice it is possible that $$\delta = 1.6 + 3 - 1.2 - 7.5 + 15.26 = 11.2 \text{ ns}.$$

The circuit arrangement illustrated in FIG. 2 also possesses a switch-over signal input FG which leads to a blocking input of the bistable trigger element BKR. Via this switch-over signal input, a switch-over signal "0" which occurs in synchronism with the exchange pulse train can switch over the previously led exchange pulse generator so that it is no longer led in accordance with the exchange pulse train occuring on the line T'. Referring to the circuit arrangement shown in FIG. 1, the previously led exchange pulse generator (CCG" in FIG. 1) can now itself lead the previously leading exchange pulse generator (CCG' in FIG. 1) by means of a connection indicated in FIG. 1 by a broken-line.

Finally it should also be noted that the frequency reducer U can be arranged to provide further pulse trains, for example a pulse train having a pulse train frequency of e.g. 8.192 MHz via the output a or, if the frequency reducer U is extended accordingly, pulse train having pulse train frequencies of e.g. 2 kHz and 250 Hz at additional outputs. In the case of all these pulse trains the phase difference between the exchange pulse trains must remain within the desired limit which in the present example amounts to 35 ns.

The embodiment described above provides the advantage that the phase difference between the exchange pulse trains supplied by the two exchange pulse generators does not exceed a limit which has the order of magnitude of the intermediate pulse train period, so that if the intermediate pulse train frequency is predetermined accordingly, the phase difference between the two exchange pulse trains can be maintained within the required limits. In addition there is the advantage that the led exchange pulse generator is not synchronised for arbitrarily small phase differences, but in fact the phase synchronisation has an associated hysteresis as a result of which any jitter in the leading (output) exchange pulse train can be disregarded.

There has thus been shown and described a novel apparatus for generating a pulse train which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

I claim:

1. Apparatus for generating an exchange pulse train for use in a telecommunications system, said apparatus including duplicate generating arrangements each arranged to be servo-synchronised by means of a master pulse train which can be received at an input of each generating arrangement, the generating arrangements being arranged to operate alternatively so that, at any one time, one leads and produces a first exchange pulse train independently of the other, led generating arrangement, the other, led, generating arrangement being arranged to produce a second exchange pulse train which is synchronised to be substantially in phase with said first exchange pulse train; each of said generating arrangements comprising, in combination: (a) means for producing an intermediate pulse train whose period is less than or equal to a predetermined permitted maximum phase difference between said exchange pulse trains; (b) frequency reducer means, connected to receive said intermediate pulse train, for deriving therefrom the exchange pulse train of the respective one generating arrangement; (c) means, adapted to receive the exchange pulse train from the respective other generating arrangement and connected to said frequency reducer means, for comparing the two exchange pulse trains to detect when the phase difference between them exceeds a threshold value of the order of the intermediate pulse train period; and (d) means for advancing or retarding the exchange pulse train of said one generating arrangement by one intermediate pulse train period if such exchange pulse train is respectively lagging or leading in phase the exchange pulse train of said other generating arrangement by said threshold value.

2. The apparatus recited in claim 1, wherein said advancing or retarding means is operative to shorten or lengthen, respectively, a one half period signal portion of the second exchange pulse train of the led generating arrangement.

3. The apparatus recited in claim 1, further comprising two frequency adjustment devices, each adapted to be supplied with a standard pulse train for producing a master pulse train with a substantially constant frequency, each generating arrangement being connected to one of said frequency adjustment devices.

4. The apparatus recited in any one of the preceding claims, wherein each generating arrangement has an intermediate pulse generator which is to be servo-synchronised by the master pulse train and has an output connected to a digital pulse reduction and phase synchronisation circuit which has a comparator with an input connected to the output of the other exchange pulse generating arrangement, and at whose output occurs the relevant exchange pulse train, the comparator being for operation only when the generating arrangement is being led.

5. The apparatus recited in claim 4, wherein the digital pulse reduction and phase synchronisation circuit possesses an intermediate pulse train frequency halving stage whose output is connected, via a phase switch-over device which is actuated whenever a phase difference exceeding the relevant threshold value is detected, to a further frequency reducer which is stepped on by one extra counting step only in the event of said second exchange pulse train lagging in phase, and whose output is connected to the exchange pulse train output of the exchange pulse generating arrangement.

6. The apparatus recited in claim 5, wherein the frequency reducer means is connected via two exchange pulse train time window circuits to respective first inputs of two logic-linking elements whose second inputs are each supplied with the exchange pulse train of the leading exchange pulse generating arrangement, and which lead via following bistable trigger elements and an OR-circuit to an adjusting element which controls the frequency reducer and whose output is also connected to a control element for the phase switch-over device.

7. The apparatus recited in claim 6, wherein the adjusting element possesses a blocking input for receiving a switch-over signal to interchange the roles of the exchange pulse generating arrangements.

* * * * *